United States Patent [19]

Ward

[11] Patent Number: 4,834,531
[45] Date of Patent: May 30, 1989

[54] DEAD RECKONING OPTOELECTRONIC INTELLIGENT DOCKING SYSTEM

[75] Inventor: Steven M. Ward, Las Cruces, N. Mex.

[73] Assignee: Energy Optics, Incorporated, Las Cruces, N. Mex.

[21] Appl. No.: 793,292

[22] Filed: Oct. 31, 1985

[51] Int. Cl.$^4$ .............. G01C 3/08; B64G 1/62; H04N 7/18
[52] U.S. Cl. .................. 356/5; 244/161; 358/107
[58] Field of Search .............. 356/1, 4, 5, 152; 244/161, 164, 171; 358/100, 103, 107, 108, 125

[56] References Cited

U.S. PATENT DOCUMENTS

| | | | |
|---|---|---|---|
| 3,224,709 | 12/1965 | Blizard | 244/161 |
| 3,285,533 | 11/1966 | Jernigan, Jr. | 244/161 |
| 3,666,367 | 5/1972 | Farnsworth et al. | 356/5 |
| 3,781,111 | 12/1973 | Fletcher et al. | 356/5 |
| 3,796,492 | 3/1974 | Cullen et al. | 356/1 X |
| 3,897,150 | 7/1975 | Bridges et al. | 356/5 |
| 3,917,196 | 11/1975 | Pond et al. | 342/23 |
| 4,003,659 | 1/1977 | Conard et al. | 356/152 |
| 4,026,654 | 5/1977 | Beaurain | 356/5 |
| 4,167,329 | 9/1979 | Jelalian et al. | 356/5 |
| 4,219,847 | 8/1980 | Pinkney et al. | 358/105 X |
| 4,260,187 | 4/1981 | Bejczy et al. | 244/161 X |
| 4,291,977 | 9/1981 | Erdmann et al. | 356/152 |
| 4,295,740 | 10/1981 | Sturges, Jr. | 244/161 X |
| 4,297,725 | 10/1981 | Shimizu et al. | 358/125 |
| 4,373,804 | 2/1983 | Pryor et al. | 356/4 X |
| 4,582,424 | 4/1986 | Kawabata | 356/1 |
| 4,620,788 | 11/1986 | Giger | 356/5 |

FOREIGN PATENT DOCUMENTS 0122890 10/1984 European. Pat. Off.
2186658 1/1974 France.
2433760 3/1980 France.

Primary Examiner—Stephen C. Buczinski
Assistant Examiner—Linda J. Wallace
Attorney, Agent, or Firm—Patrick M. Hogan

[57] ABSTRACT

An intelligent, optoelectronic docking system for use in manned or unmanned spacecraft for automatically docking with a target spacecraft. The system is a multifaceted, active sensor using a controlling microprocessor to integrate the operation of independently triggerable laser sources for target illumination and optical receiver arrays for target detection. Returning signal waveforms are processed to sense the direction, range, and attitude of a target docking surface which may be equipped with passive optical aids to enhance the reflective signature. The docking system reconfigures its active sensor elements as the target range closes by sequentially employing three laser transceiver arrangements. As a result, the system effectively tracks a target from a range of several hundred meters down to a range of only a few centimeters. The system microprocessor operates on data received from each sensor arrangement to generate the information necessary to guide a host spacecraft safely through hard docking maneuvers. Wide field coverage is achieved without moving parts by electronic selection of independently directed laser beams.

23 Claims, 9 Drawing Sheets 4,834,531

DEAD RECKONING OPTOELECTRONIC INTELLIGENT DOCKING SYSTEM

BACKGROUND OF THE INVENTION

This invention was made with government support under contract No. NAS 9-17283 awarded by the National Aeronautics and Space Administration. The government has certain rights in this invention.

FIELD OF THE INVENTION

The present invention relates generally to a modular docking system for use in host space vehicles which must perform satellite capture maneuvers and the like, where automated docking is required. In particular, the present invention is a microprocessor based, optoelectronic sensor system interacting with target mounted, passive optical aids for the purpose of providing target range, position and attitude information necessary for the host guidance system to execute a hard docking.

DESCRIPTION OF THE PRIOR ART

The docking of two spacecraft has in the past been a primarily manual operation. Such maneuvers are executed by a highly trained astronaut, visually acquiring and tracking a target, while manipulating control mechanisms to fly the host vehicle to a desired docking point. Recent events in the U.S. space program have fostered new impetus toward the development of effective procedures and systems for automating rendezvous, station keeping, tethering, berthing and docking of spacecraft. Three particular space vehicles which are currently under some phase of development, (1) Space Station, (2) Orbital Maneuvering Vehicle and (3) Mars Probe, require new technology for automatic docking. In some cases, unmanned docking can be accomplished by teleoperations or remote control. Such techniques rely on downlink telemetry of TV images which are monitored by a controller on the ground, transmitting guidance commands back to the vehicle on the telemetry uplink. However, the large number of future docking missions and the vastness of space eliminate the use of teleoperations in many scenarios.

Although Radio Frequency (RF) technology has long been developed for acquiring and tracking targets for various purposes, the magnitude of RF wavelengths preclude operation at very close ranges and cannot be adapted for the precision measurement capability required for automated docking. It is well understood in the art that effective docking technology must operate in the optical, IR or millimeter wave spectra.

A large number of commercial and military optoelectronic systems such as stereoscopic robot vision, optical contrast video trackers, laser guided seekers, forward looking infrared imaging devices, laser radar and laser interferometers are currently available and appear applicable to automated docking. However, all known systems are burdened with practical disadvantages such as large size, fragile components, large power dissipation and a general requirement for moving mechanisms for beam steering, field scanning, focusing, cooling and aperature control which preclude application in an autonomous, space environment.

Recent developments in automated docking technology have taken two distinct directions. One approach represents an extension of TV teleoperations, relying on automated computer processing of video signals generated by TV cameras to sense position, range and attitude of a target. The second approach lies in the use of laser radar, scanning a narrow laser beam over a wide field and processing target reflected returns for position, range and attitude. With the necessary target data base, a guidance/navigation/control computer generates guidance commands to maneuver the host vehicle to the target docking port.

Although both such methods provide a target sensing and measurement capability, specific limitations preclude practical implementation in space. TV systems, which must rely on solar target illumination, are frought with difficulties in dealing with high contrast shadows, low contrast target geometries and/or operation in the earth's shadow. In addition, TV systems must process millions of bytes of video pixel data to deduce the necessary target information, resulting in a significant burden in computer size, memory capacity and processing time. Further, conventional TV optics must be adjusted for exposure and focus, requiring moving mechanical devices which limit long term operational reliability. On the other hand, laser scanning systems generally involve large, high power laser sources and require moving mechanisms (galvanometer mirrors and the like) to steer the narrow laser beams over the sensor field. Such systems are generally fragile, have substantial mass, consume large amounts of power and place a severe limitation on the overall system reliability and operating lifetime.

SUMMARY OF PRESENT INVENTION

The present invention, generally described as a Dead Reckoning Optoelectronic, Intelligent Docking, hereinafter referred to as "DROID", system, is a microcomputer based system for use on spacecraft which must automatically maneuver to hard docking with targets equipped with passive, optical aids with a reduced range capability for docking non-cooperative targets. The DROID system performs target acquisition, tracking, homing, relative attitude adjustment, relative roll correction, hard docking and self diagnostics. The system operates over target distances from about 1000 meters to about 20 centimeters, generating guidance control commands required to steer the host vehicle through the maneuver. Key salient features of the invention include autonomous operation, small size, low mass, all solid state components, target illumination at a single laser line and most importantly, no moving parts.

The DROID system combines three, highly integrated sensor subsystems with a Master Central Processing Unit (CPU) to generate a target database and compute host vehicle guidance commands. Each sensor is a distinct form of laser radar (or more commonly termed LIDAR) configured to provide range dependent measurement resolution required for conducting a safe hard docking maneuver. The Pulsed Array LIDAR (PAL) sybsystem is configured for long range operation from about 1000 meters to about 30 meters. The Continuous Array LIDAR (CAL) subsystem provides more precise target sensing at ranges from about 50 meters to about 3 meters. The Charge Coupled Device (CCD) Television LIDAR (CTL) subsystem is configured for extremely precise target sensing at ranges from 5 meters to about 20 centimeters. The Master CPU sequences the operation of each sensor subsystem, accepting target data and computing the guidance commands necessary to maneuver the host vehicle.

Passive, retroreflective optical aids strategically located near the docking port of the target represent an integral factor in long range sensing. The retroreflective nature of each device allows the use of very low power, wide beam semiconductor lasers for target illumination, minimizing the power burden of the system and enhancing system reliability.

In a typical rendezvous and docking mission, initial target rendezvous is accomplished by various other navigation techniques including the Global Positioning System and conventional Radar. Therefore, the primary purpose of the present invention is to sense the target at relatively close ranges (under a few thousand meters) and to precisely control the terminal phase of the hard docking maneuver. For example, when the DROID system is enabled by the host guidance computer, the Master CPU executes a spiral search maneuver and activates the PAL subsystem in an attempt to acquire the target at typical closing velocities of about 50 meters per second. When the target is acquired, PAL passes target position and range data to the CPU, which generates pitch, yaw and +Z commands to center the target on the host Z axis (an imaginary line emanating from the docking probe) and to close the target. As the target range closes, −Z commands gradually slow the closing velocity to about 1.0 meter per second. At a ragne of 50 meters, the CAL subsystem is activated and tested for proper operation. At 30 meters range, operation is handed over to CAL which senses target position, range and attitude by precisely ranging each of three individual retroreflectors mounted in a triangular pattern on the target surface. The CPU processes target data and maneuvers the host onto the target Z axis (an imaginary line emanating from the center of the docking port), orients the host at the appropriate attitude and spins the host to match the roll rate of the target. Again −Z commands serve to reduce closing velocity to about 10 centimeters per second. At a range of 5 meters, the CTL subsystem is activated and tested for proper operation. Target sensing is handed over to the CTL sensor at a range of 3 meters to control the final, hard docking operation. The CTL acquires a retroreflective, docking image plate located near the docking port and generates data indicating target range, position and attitude. The Master CPU processes CTL data to precisely maneuver the docking probe into the docking port, sense the contact, lock the probe into place and terminate the operation. At any time in the mission that an active DROID system sensor fails to track the target, the CPU outputs a "bailout" command to abort the mission and to maneuver in a manner to avoid collision.

It is, therefore, the primary object of the present invention to provide a fully automatic space docking system which senses a target equipped with passive optical aids and guides a host vehicle to a desired docking port which overcomes the disadvantages, shortcomings, and difficulties of prior art systems.

It is a more specific object of the present invention to provide a hard docking system operating independently of solar illumination and providing wide field coverage with no moving parts for beam steering, camera focusing or any other function.

It is a further object of the present invention to provide a fully automatic space docking system which senses a non-cooperative target and guides a host vehicle to the target for docking.

It is a still further object of the present invention to provide a fully integrated optoelectronic sensor system operating properly in any ambient lighting conditions at a single wavelength (laser line).

It is a still further object of the present invention to provide a small, low mass docking sensor which comprises all solid state, electronic and optoelectronic components with an operating lifetime of at least 10 years.

It is a still further object of the present invention to provide an intelligent sensor which reconfigures itself through the mission, resulting in improved target measurement resolution as the range closes.

It is a still further object of the present invention to provide a docking system capable of sensing target position, range and attitude at very short distances under one meter.

It is a still further object of the present invention to provide a docking system operating at a very low power burden under 30 watts.

It should be noted that although the invention is described as an Orbital Maneuvering Vehicle subsystem, guiding the vehicle through an automated satellite capture mission, the DROID system is applicable to any other space vehicle such as the space shuttle, the orbital transfer vehicle, Mars probe and the space station, supporting all kinds of proximity operations.

For a better understanding of the present invention, together with other and further objects thereof, reference is had to the following description taken in connection with the accompanying drawings, and its scope will be pointed out in the appending claims.

DETAILED DESCRIPTION OF THE INVENTION

Figure 1:
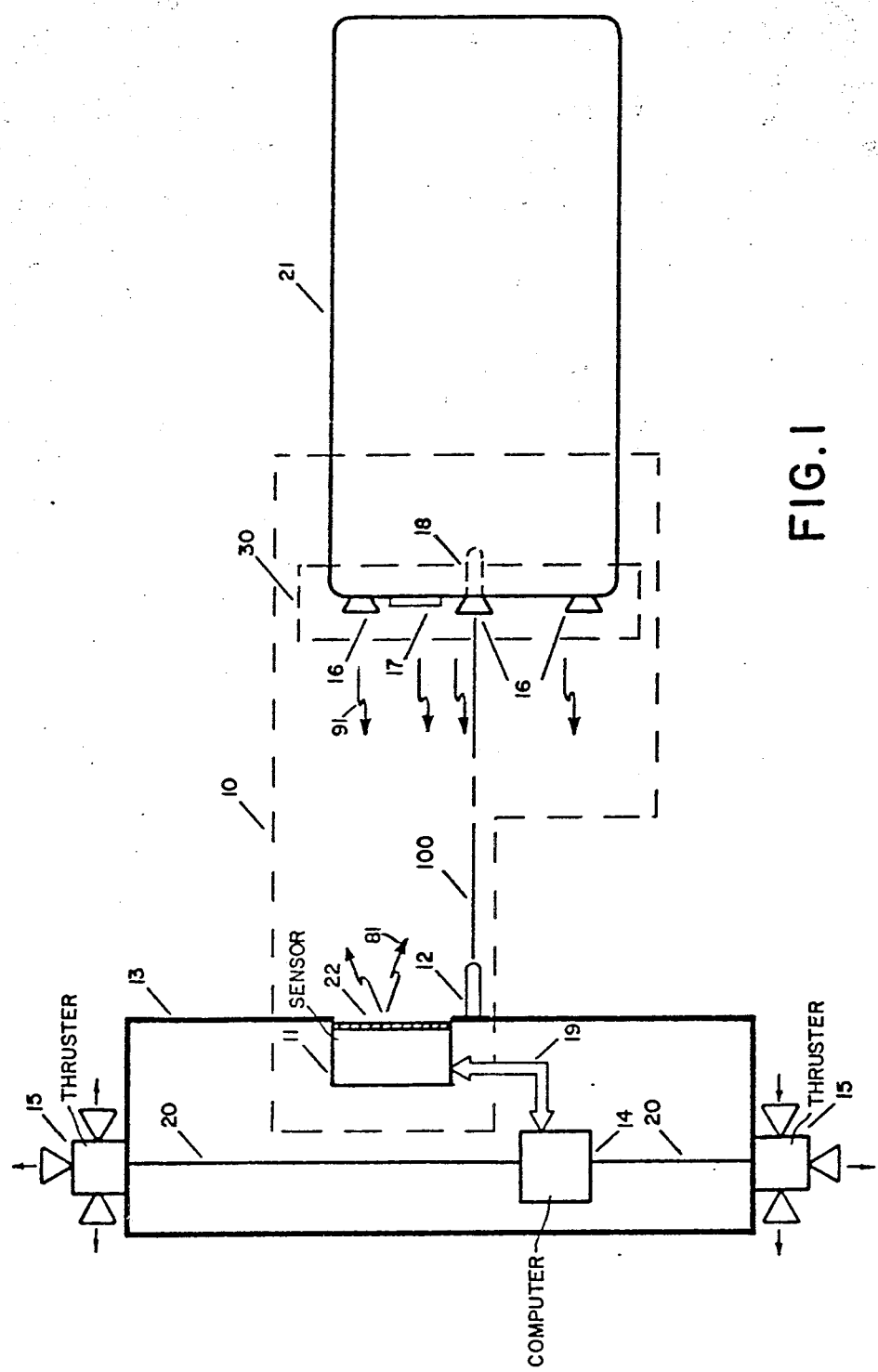
FIG. 1 is a perspective view of the DROID System.

An illustration of the DROID system 10 is shown in FIG. 1. The system includes an intelligent sensor package 11 strategically positioned relative to a docking probe 12, both of which are mounted on the host or chaser space vehicle 13. The intelligent sensor 11 passes guidance commands by means of a data bus 19 to a host GNC computer 14. The computer 14 directly controls thruster mechanisms 15 by means of control cables 20 to maneuver the spacecraft 13. The DROID system 10 also includes retroreflectors 16, a retroreflective docking plate 17 and a docking port 18 located on the target vehicle 21. The DROID system 10 illuminates the target vehicle 21 by coherent laser light 81 in the near IR spectrum, senses retroreflected source radiation 91 and processes the returns 91 in a manner to determine the relative angular direction, range and attitude of the target vehicle 21. The target vehicle 21 orientation parameters are processed to generate host vehicle 13 guidance commands necessary to insert the docking probe 12 into the docking port 18 for a safe, hard docking. The intelligent sensor 11 operates through a window 22 which is effective to pass only a narrow band of radiation 91 about the operating wavelength of the system 10.

Figure 2:
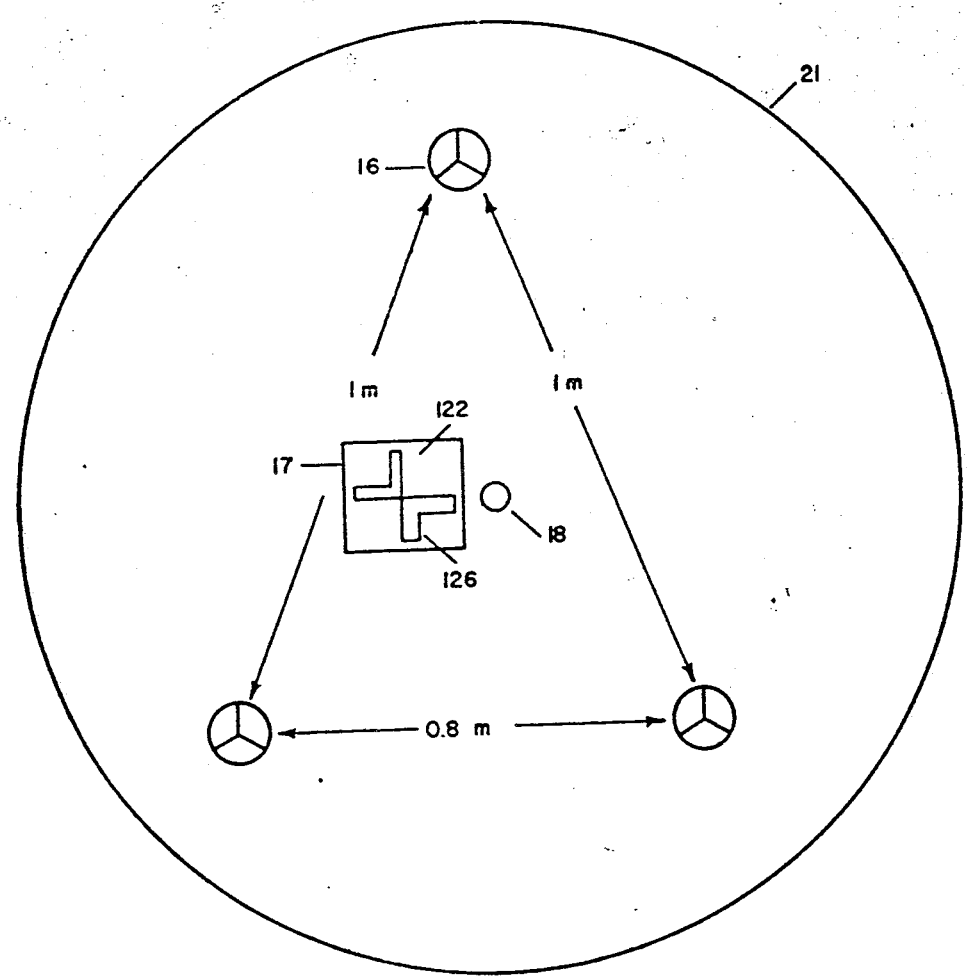
FIG. 2 is a schematic illustration of the retroreflective target aids.

The retroreflective optical aids 30 are more clearly illustrated in FIG. 2. The term retroreflector as used herein defines an optical reflector which returns incident light to its source, regardless of the angle of incidence. Of course, a perfect retroreflector would return the diverging laser beams directly back into the laser optics. However, typical retroreflectors have a finite divergence depending on manufacturing tolerances and the source angle subtended. Retroreflectors 16 of the type described herein exhibit full angle divergence on the order of 0.09 milliradians at long ranges, increasing to about 1.0 milliradian at a range of 50 meters (due to source angle subtense). Retroreflectors 16 are arranged in the pattern of an isosceles triangle with two 1.0 meter sides and one 0.8 meter side. This arrangement allows the target vehicle 21 roll angle (not shown) to be determined without ambiguity by imaging the reflector pattern. The retroreflectors 16 are used by the longer range DROID sensor subsystems 40, 50 to enhance the target signature.

A second optical aid 17, the docking image plate, which is used by the short range DROID sensor subsystem 60 is located near the docking port 18. The docking port 18 is positioned at the target centroid, the geometrical center of the docking surface. The image plate 17 comprises a square, retroreflective, white surface 122 subtending a non-retroreflective, black crosshair pattern 126. The retroreflective bead surface 122 is similar to common bicycle reflective tape with a relatively wide, 10 degree, full angle divergence. Interactions between the DROID sensors, 40, 50, 60 and the optical aids 30 are described in following paragraphs.

It should be pointed out that optical aids 30 of the type described herein, serve only to enhance the target vehicle 21 signature, providing significant increases in operational range. At reduced ranges, the DROID system 10 can automatically dock a target vehicle 21 without the help of optical aids 30.

Figure 3:
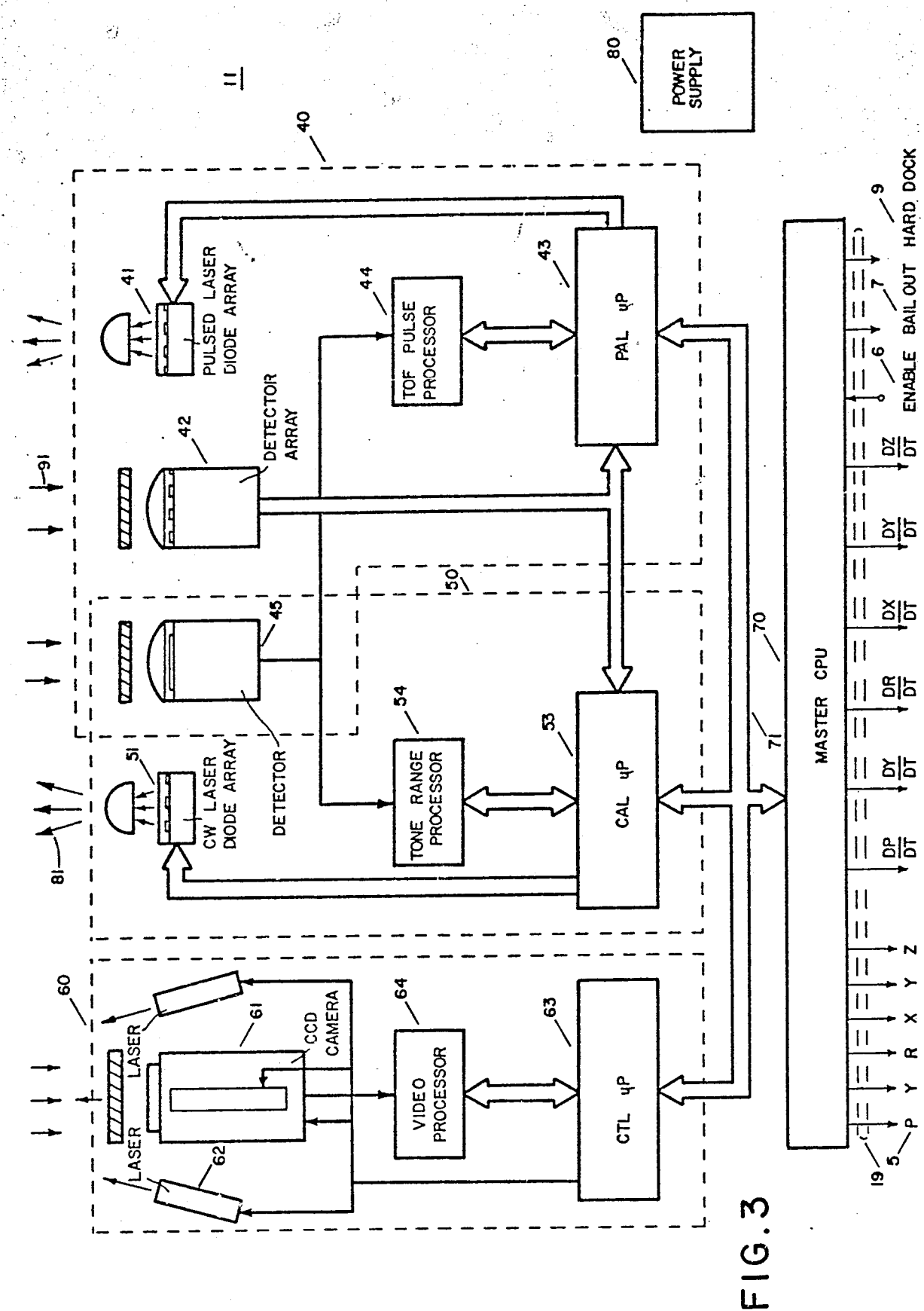
FIG. 3 is block diagram of the DROID System.

A block diagram of the intelligent DROID sensor 11 is shown in FIG. 3. The sensor 11 comprises a Pulsed Array LIDAR (PAL) subsystem 40, a CW Array LIDAR (CAL) subsystem 50, a CCD TV LIDAR (CTL) subsystem 60, a Master CPU 70 and a power suupply 80. The DC power supply 80 provides for a maximum power requirement of thirty watts. The optical systems of all three sensors are co-aligned, operating over a field of 20° azimuth by 20° elevation. The design of each LIDAR subsystem is optimized over specific operating range brackets with improving target vehicle 21 sensing resolution and decreasing sensitivity as the range closes. The CPU 70 first activates the PAL subsystem 40 which employs a pulsed laser diode array 41 to illuminate the retroreflectors 16, a PIN diode detector array 42 for sensing target returns 91 and a time-of-flight pulse processor 44 for target ranging. PAL provides for long range target vehicle 21 acquisition, tracking and ranging (resolution $<\pm 3.0$ meters) over a range bracket from 1000 meters to 30 meters. As the target range closes, the CAL subsystem 50 is activated, employing a CW laser diode array 51 to illuminate retroreflectors 16 and a PIN diode detector array 45 to sense target returns 91 and a tone range processor 54 for target ranging. CAL provides for target vehicle 21 tracking, ranging (resolution $<\pm 3.0$ centimeters) and attitude sensing (resolution $<\pm 3.0$ degrees) over a range bracket of 50 meters to 3 meters. In the final phase of the docking maneuver, the CTL subsystem 60 is activated, employing both previously mentioned laser arrays 41, 51 to illuminate the docking plate 17 and a CCD solid state TV camera 61 and a video processor 64 for target tracking, ranging (resolution $<\pm 1.0$ centimeter) and attitude sensing (resolution $<\pm 2.0$ degrees) over a range bracket from 5 meters to 20 centimeters. In addition, the CTL sensor 60 employs four narrow beam diode lasers 62, strategically oriented to designate bright spots (not shown) on the docking plate 17 to be processed for range and attitude sensing in close proximity. The three sensor subsystems 40, 50 and 60 are controlled by a Master CPU microprocessor 70 which communicates with each sensor by means of a two way data bus 71. The three sensors 40, 50 and 60 (only one of which is active at a time) sense the target aids 30 and pass target data (not shown) to the Master CPU 70. The CPU 70 processes target data and performs the necessary computations to generate host vehicle 13 guidance commands 5. Guidance commands 5 are transferred to the host GNC computer 14 by means of a two way data bus 19.

PULSED ARRAY LIDAR

Figure 4:
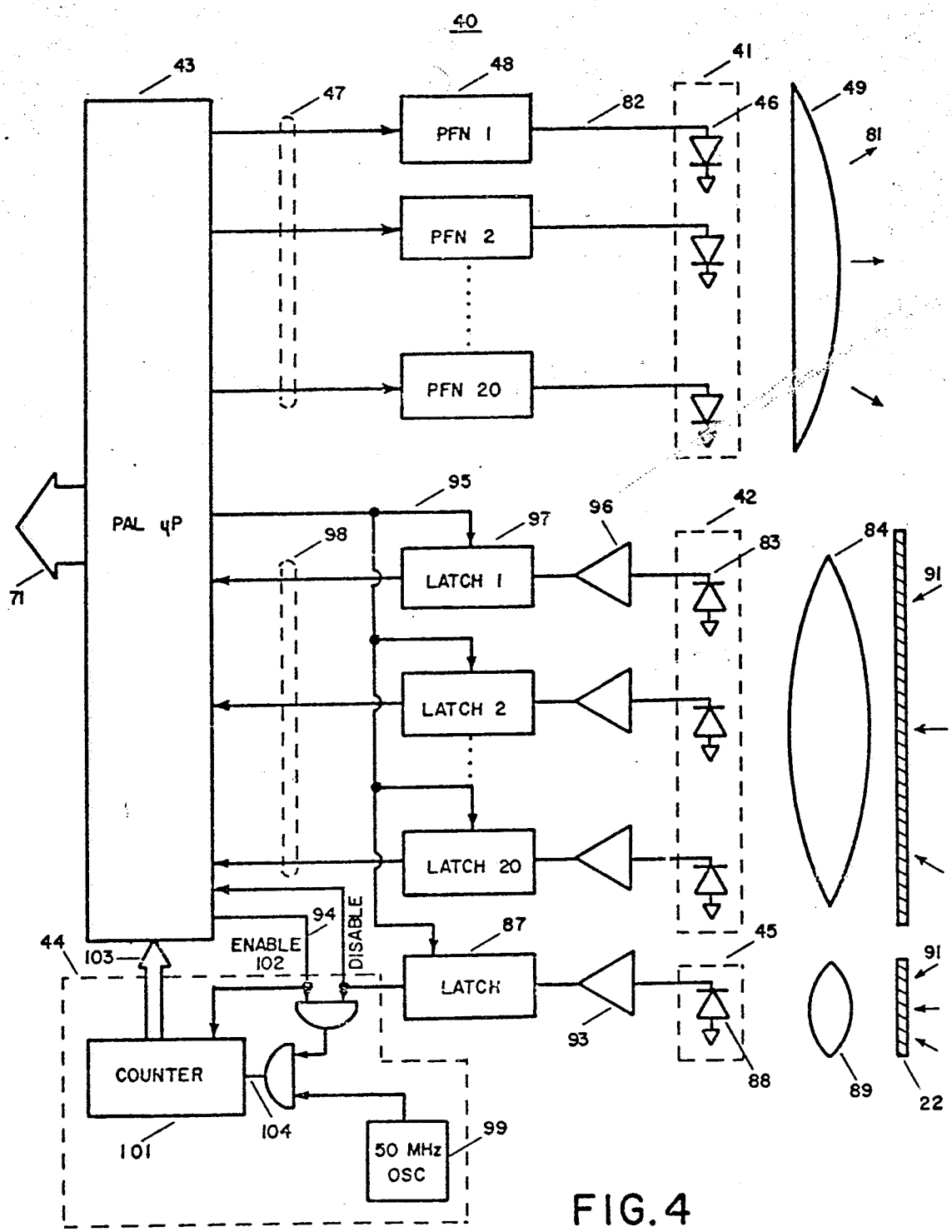
FIG. 4 is block diagram of the PAL subsystem.
Figure 5:
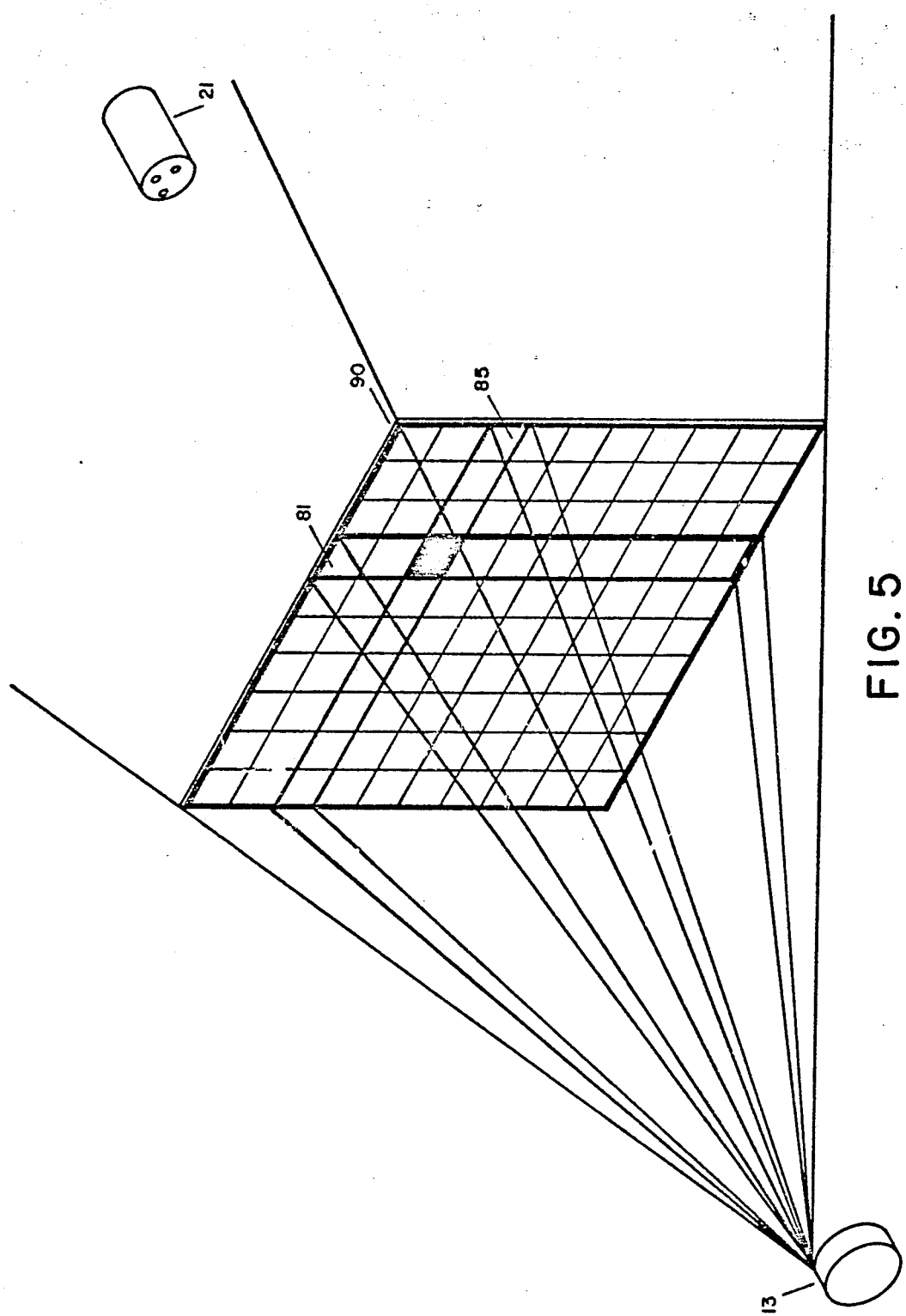
FIG. 5 is an illustration of the PAL and CAL emitted beam patterns and detector fields.

The PAL sensor subsystem 40, which operates over target ranges from 1000 meters down to 30 meters, is described in greater detail with reference to FIG. 4 and FIG. 5. PAL 40 comprises a twenty element GaAs diode laser array 41, a twenty element silicon PIN diode detector array 42, a single element wide field-of-view (FOV) receiver 45, a time-of-flight (TOF) pulse processor 44 and a single-chip microcomputer controller 43. The transmitter array 41 is configured so that each laser element 46 is independently triggerable by the microcontroller 43. The microcontroller 43 fires a laser diode 46 by writing a control word on output port 47. The control word comprises a digital "one" bit corresponding to the laser selected and digital "zeros" on all nineteen other lines. The digital "one" activates a pulse forming network 48 which drives a twenty ampere current pulse (100 nanoseconds in duration) via line 82 through the selected diode 46, resulting in a 905 nanometer laser pulse 81 with peak power on the order of five watts. The diode array 41 is arranged with a cylindrical lens system 49 in a manner that generates vertically oriented, elongated beam 81 cross-sections which are 1° wide and 20° high. The optical system 49 directs the twenty juxaposed and non-overlapping beams 81 of each laser diode 46 in a manner providing a contiguous field coverage of 20° by 20°. Transmitting each selected beam 81 (one at a time) and looking for target returns 91 after each such transmission, allows the microcontroller 43 to locate the azimuth angle of the target vehicle 21 in the DROID system 10 optical field 90 with a resolution of $\pm 1°$.

The PAL detector array 42 is a group of twenty PIN photodiodes 83, each with an aspect ratio of 1×20 (including interdiode gaps), with the minor axes stacked on a single substrate (not shown). The resulting total aspect ratio is then 20×20 representing a square active area. Orienting the diodes 83 with the major axes horizontal and adding a double convex objective lens 84 provides twenty juxaposed and non-overlapping fields-of-view which are individually 20° wide and 1° high. Combined, the fields provide a 20°×20° contiguous field-of-view. Co-aligning the optical systems 49, 84 of the transmitter array 41 and the detector array 42 provides a 20° horizontal by 20° vertical sensor coverage and an orthogonal relation between the major axes of transmitter beam 81 cross-sections and receiver FOVs 85. Now referring again to FIG. 5, identifying the specific transmitter beam 81 and the receiver FOV 85 corresponding to a target return 91 allows the PAL microcontroller 43 to locate the azimuth and elevation angles of the target in the sensor field 90 to a resolution of ±1°.

Once the PAL microcomputer 43 is activated by the Master CPU 70, it initially attempts to acquire a target by sequentially firing each laser beam 81 and testing the single element receiver latch 87 for a target return 91. The wide field receiver 45 is a single element, large area photodiode 88 arranged with an objective lens 89 and an IR filter 22 in a manner providing a conical FOV (not shown) of roughly 30° full angle, co-aligned with the optical systems 49, 84 previously described. Pulsed IR radiation (905 nanometers wavelength) 91 passing the filter 22 generates a signal pulse (not shown) at the photodiode 88 which is amplified by a wideband video amplifier 93 to a level triggering a latch circuit 87. The latch 87 holds a digital "one" on an input line 94 to the PAL microcomputer 43 until the microcomputer 43 acknowledges the input by toggling output line 95, thereby clearing the latch. PAL microcomputer firmware fires the first laser diode 46 and tests the latch 87 output state. If no return 91 is sensed, the next diode in the array 41 is triggered and so on. Assuming a maximum target closure rate of 50 meters per second, the entire field 90 is scanned at a rate of 500 Hz or ten field 90 scans per meter of closure.

Referring again to FIG. 4, the PAL subsystem 40 continues to scan the field 90 until a target return 91 is sensed on the latch 87 input line 94. The PAL microcomputer 43 stores a return count of one and clears the latch 87 by toggling line 95. In order to avoid the possibility of a false alarm, the PAL microcomputer 43 continues the target acquisition scan until "n" consecutive returns 91 are detected, verifying that the target vehicle 21 has actually been acquired and terminating the acquisition routine.

Once target acquisition is confirmed, the PAL microcomputer 43 sequences to the target tracking mode by activating the PIN receiver array 42. Each element of the detector array 42 includes a signal amplifier 96 and a latch circuit 97 identical to that previously described for the wide field receiver 45. The latch array 97 is tied to the PAL microcomputer 43 by means of a twenty line input port 98, which can be read (in parallel) by a single instruction. All latch states are cleared simultaneously, when the PAL microcomputer toggles line 95. In the tracking mode, PAL microcomputer 43 alternates between firing a laser beam 81 and reading the receiver port 98 for target returns 91. Any 905 nanometer target return 91 passes through the IR filter 22 and is focused by lens 84 onto the PIN diode array 42. Pulsed energy levels exceeding receiver sensitivity result in latched digital levels at the PAL microcomputer 43 input port 98. If all input lines of the port 98 are zeros, the microprocessor 43 assumes that no target vehicle 21 is present in the transmitted beam 81 and sequences the operation to the next beam. When a transmitted beam 81 intercepts the target vehicle 21, one or more of the receiver latches 97 will go high to a digital "one" state. By monitoring the beam output line 47 number transmitted and identifying the active receiver line 98 number, the PAL microcomputer 43 locates the target vehicle 21 in one of the 400, -1° by 1° field elements illustrated in FIG. 5.

With the target vehicle 21 located in the sensor field 90, the PAL microcomputer 43 outputs relative target azimuth and elevation angles to the Master CPU 70 by means of data bus 71. The Master CPU subsequently computes and outputs the pitch, yaw and +Z commands to the host computer 14 (via data bus 19) required to point the host Z axis 100 directly at the target vehicle 21 and to close the target on a direct line.

While the PAL microcomputer 43 tracks the target 21, it also measures target range by pulse processing which is well known in prior art. The TOF range processor 44 comprises a 50 megahertz oscillator 99 and a high speed counter 101 effective to resolve 20 nanosecond time elements. The TOF processor 44 is configured to measure the propagation time of each laser pulse 81 to the target vehicle 21 and back. The round trip propagation time is related to target range by the speed of light. When the PAL microcomputer 43 outputs a control word on port 47 to fire a laser diode 46, it simultaneously outputs a "one" on line 102 which clears the counter 101 and enables the 50 mhz clock 99 input 104. The counter continues to register clock strobes 104 until the leading edge of the target return 91 sets latch 87, thereby disabling the clock input 104 to the counter 101. After a target return 91 is detected, the PAL microcomputer 43 reads the counter 101 by means of a parallel input port 103. The range count is then transferred to the Master CPU 70 by means of data bus 71. The Master CPU 70 determines target range by dividing the count of 20 nanosecond time elements by two and multiplying the result by six ($20 \times 10^{-9}$ sec $\times 3 \times 10^8$ m/sec=6). Further, the CPU stores the range on each subsequent scan, in order to compute the range closure rate by dividing the change in range by the time between sample (dR/dt). This technique provides a range measurement resolution of about ±3.0 meters, which is sufficient for the long range maneuver.

The PAL microcomputer 43 continues to operate in this mode while the CPU 70 slows the rate of closure (outputting −Z commands) to about 1.0 meter per second at a range of 50 meters. At this range, the CAL subsystem 50 is activated by the CPU 70 for diagnostic testing. If the CAL subsystem 50 fails to operate properly, the CPU 70 outputs a "bailout" command to the host GNC computer 14 and terminates the mission. If, however, the CAL subsystem 50 passes such diagnostic testing, it takes over the target sensing operation at a range of 30 meters, and the PAL subsystem 40 is deactivated.

Since the PAL subsystem 40 is controlled by a microcomputer 43, a key component lies in the microcomputer firmware that executes the above described operation. The operational firmware is described in the following "pseudo code" listing, where each line represents a machine language program designed to execute the indicated function:

```
TARGET ACQUISITION
    INITIALIZE SCAN
    SET B = 1
    SET COUNT = 0
40  FIRE BEAM #B
    CLEAR WIDE FIELD (WF)RECEIVER LATCH
    DELAY LOOP
    READ WF RECEIVER LATCH
    TEST FOR TARGET RETURN
    IF TARGET GOTO 130
```

```
        ELSE B = B + 1
        IF B = 21 THEN B = 1
        GOTO 40
    130 COUNT = COUNT + 1
        IF COUNT = N GOTO 200
        ELSE B = B + 1
        IF B = 21 THEN B = 1
        GOTO 40
TARGET TRACK AND RANGE
    200 INITIALIZE SCAN
        SET B = 1
    220 FIRE BEAM #B
        OUTPUT ENABLE RANGE COUNT
        CLEAR ARRAY (AR) RECEIVER LATCHES
        DELAY LOOP
        READ AR RECEIVER BUS (R)
        READ RANGE COUNT (C)
        TEST R > 0
        IF SO - TARGET: X=#B, Y=#R, R=C
        GOTO 320
        ELSE X=#B, Y=0, R=0
    320 STORE (X,Y,R)
        B = B+1
        IF B < 21 THEN 220
        ELSE INDICATE DATA READY
        OUTPUT DATA TO CPU (X,Y,R)
        GOTO 200.
```

CW ARRAY LIDAR

Figure 6:
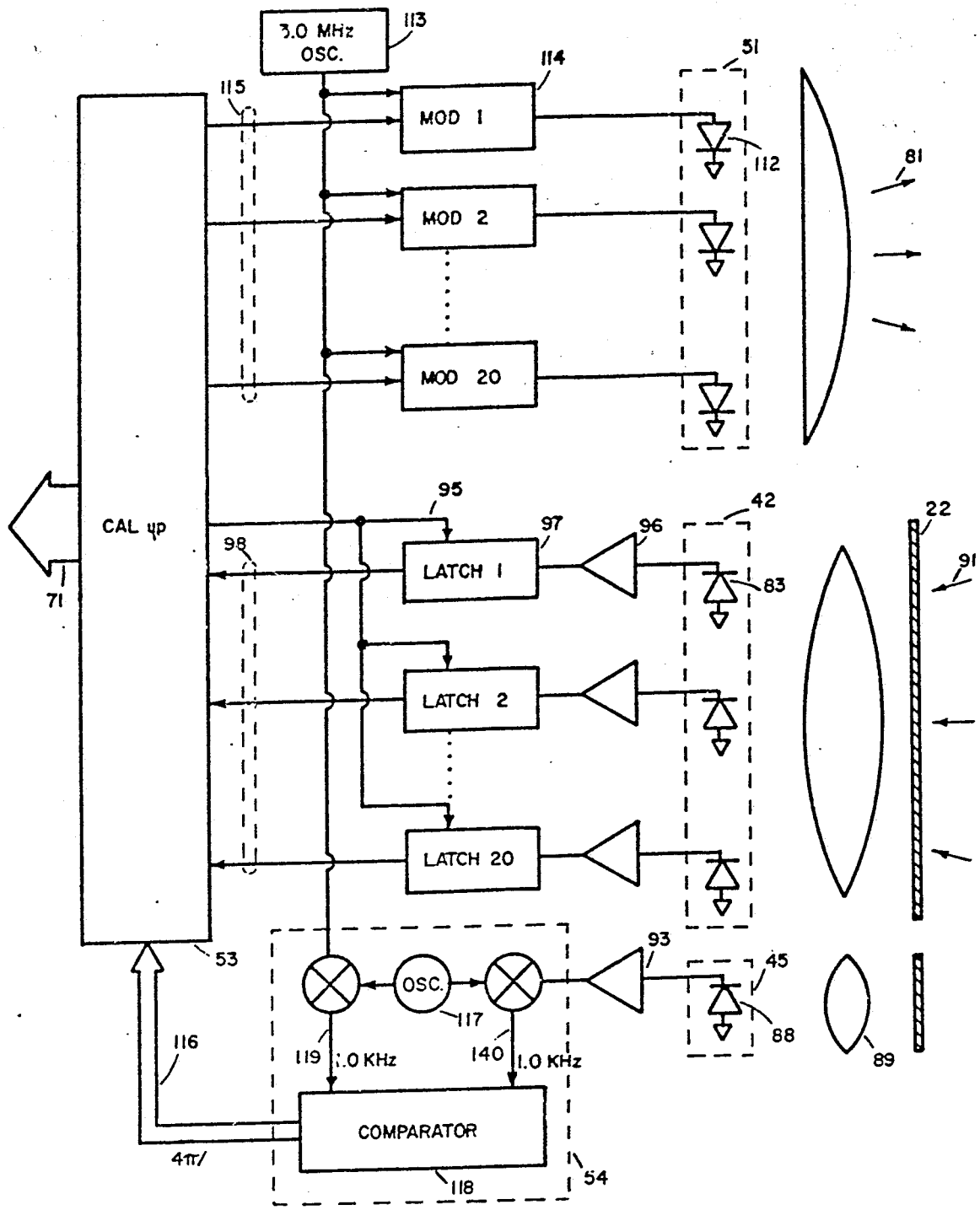
FIG. 6 is a block diagram of the CAL subsystem.

The CAL sensor subsystem 50 is described with reference to FIG. 5 and FIG. 6. CAL 50 includes a CW diode laser array 51, the same PIN diode detector array 42 previously described, a tone range processor 54, the same wide field receiver 45 previously described and a CAL microcomputer 53. In order to minimize size and weight of the total DROID system 10, subsystem hardware is shared where practical. The CW laser diode array 51 is optically equivalent to the transmitter array 41 of the PAL system 40, in that twenty vertically oriented beams 81 are propagated over the 20° by 20° field 90 as seen in FIG. 5. The difference lies in the fact that the laser diodes 112 employed in CAL 50 are of the continuously emitting type rather than the pulsed type described for the PAL sensor 40. Continuous emission is required for the high precision tone range measurement technique employed in the CAL sensor 50. CW diodes 112 are characterized by relatively low output power and, therefore, short operating range. CAL diodes 112, when active, are driven with a CW current of about 0.1 ampere resulting in an output power of about 0.010 watt. The diodes 112 are amplitude modulated by varying the drive current in any desired waveform. A 30 megahertz oscillator 113 provides a modulation tone (not shown) which is imposed on the drive current of each diode 112 by modulation circuitry 114. As in the PAL sensor 40, the CW diodes 112 are selected (one at a time) for transmission by the CAL microcomputer 53 by writing a digital word to output port 115. Each diode 112 radiates continuously for the entire period that it is selected. A 50 Hz field scan rate results in a minimum 1.0 millisecond ON time for each diode 112 when selected.

The receiver 42 operates exactly as described for the PAL sensor 40, with the exception that the lower signal strength of the CW diodes 112 reduces the maximum operating range to about 64 meters. The orthogonal relation between the vertically elongated transmit beams 81 and the horizontally elongated detector FOVs 85 again allows the CAL microcomputer 53 to resolve the target relative angular direction ±1° in both azimuth and elevation. However, at ranges under about 15 meters, the CAL sensor 50 must resolve multiple targets, because the subtense of the three retroreflector 16 pattern exceeds the 1° sensor field elements (see FIG. 5). This is accomplished in a straight forward manner by the procedure previously described. Each time a beam 81 is transmitted, the CAL microcomputer 53 tests the receiver bus 98 for target returns 91. If no returns 91 are detected, operation is sequenced to the next beam. If one or more receiver latches 97 are high, then the active beam number and the active receiver line numbers are stored for later transfer to the Master CPU 70, the receive latches 97 are cleared by toggling line 95 and operation is sequenced to the next beam. Scanning the field 90 in this manner, provides the CPU 70 with continuously updated azimuth and elevation coordinates for each of the target retroreflectors 16. The coordinates on sequential scans are processed to compute the angular direction of the docking port 18, the target roll angle and the roll rate.

While the CAL sensor 50 tracks the target vehicle 21, it must also precisely range each of the three retroreflectors 16 in order to determine the target attitude (or the orientation of its Z axis). The function of the CAL sensor 50 is to provide the information necessary to maneuver the host vehicle 13 to a position and orientation aligning the docking probe 12 axis 100 with that of the target docking port 18 for the final approach. Tone ranging techniques which are known in prior art are employed to measure the range from the sensor 50 to each reflector 16 to a resolution of about ±3.0 centimeters. The tone range processor 54 compares the phase of the 3.0 Mhz modulation transmit tone 113 to the 3.0 Mhz tone received from each reflector 16 to a resolution of one part in 3,333 to determine the propagation delay and, thereby, the range. When the CAL microcomputer 50 detects an active latch return line 98, it allows the output beam to remain on the target vehicle 21 for sufficient time for the tone range processor 54 to accurately measure the phase relation (not shown). Heterodyne techniques are employed to beat the 3.0 Mhz signals against a 2.999 Mhz reference 117, so that lower frequency (1.0 Khz) signals 119, 140 can be processed in a phase comparator circuit 118. The delay period between the zero crossing of the transmit signal 119 and that of the receive signal 140 corresponds to the reflector 16 range. A digital value representing the phase delay is read by the CAL microcomputer 50 from the comparator 118 by means of a data bus 116. At the end of each field 90 scan, three sets of target coordinates and phase delay values (one set for each retroreflector 16) are transferred to the CPU 70 via data bus 71. The CPU 70 processes the data to determine the attitude of the target and transfers guidance commands 5 via bus 19 to the host GNC computer 14 required to maneuver the host 13 onto the target Z axis 100 and to point the docking probe 12 directly at the docking port 18.

At a range of about 5 meters, the CPU 70 processes sequential scans to accurately measure closure rate and the roll rate of the target. Periodic −Z commands are generated to slow the rate of closure to about 0.1 meter per second. In addition, roll commands are generated to spin the host 13 in a manner to zero the relative roll rate between the target vehicles 21 and the chaser 13, so that the final hard docking maneuver can be performed.

Once the host 13 is properly oriented and the range is under 5 meters, the Master CPU 70 activates the CTL subsystem 60 for diagnostic testing. If the CTL 60 fails to operate properly, a "bailout" command is transferred via data bus 19 to the GNC computer 14, and the mission is terminated. If the CTL 60 passes diagnostic testing, it takes over the target sensing operation at a range of 3 meters, and the CAL subsystem 50 is deactivated.

Since the CAL subsystem 50 is controlled by a microcomputer 53, a key component is the microcomputer firmware that executes the operation described above. The operational firmware is given below in a "pseudo code" listing, where each line represents a machine language program to execute the indicated function:

```
MULTIPLE RETRO TRACK AND RANGE
    10 INITIALIZE SCAN
        SET B = 1
    30 ENABLE BEAM #B
        CLEAR ARRAY (AR) RECEIVER LATCHES
        READ RECEIVER BUS (R)
        TEST #R > 0
        IF #R = 0 THEN X = #B, Y = 0
        IF MULTIPLE RETURNS THEN X = #B, Y = 255
        IF ONE RETURN THEN X = #B, Y = #R
        IF Y = 0 OR Y = 255 THEN R = 0 GOTO 120
        GOTO 200
    120 DISABLE BEAM #B
        STORE (X,Y,R)
        B = B +1
        IF B < 21 THEN 30
        ELSE INDICATE DATA READY
        OUTPUT DATA TO CPU (X,Y,R)
        GOTO 10
TONE RANGE PROCESSING
    200 ENABLE PHASE PROCESSOR
        DELAY LOOP
        READ PHASE COUNT (R)
        GOTO 120.
```

CCD TV LIDAR

Figure 7:
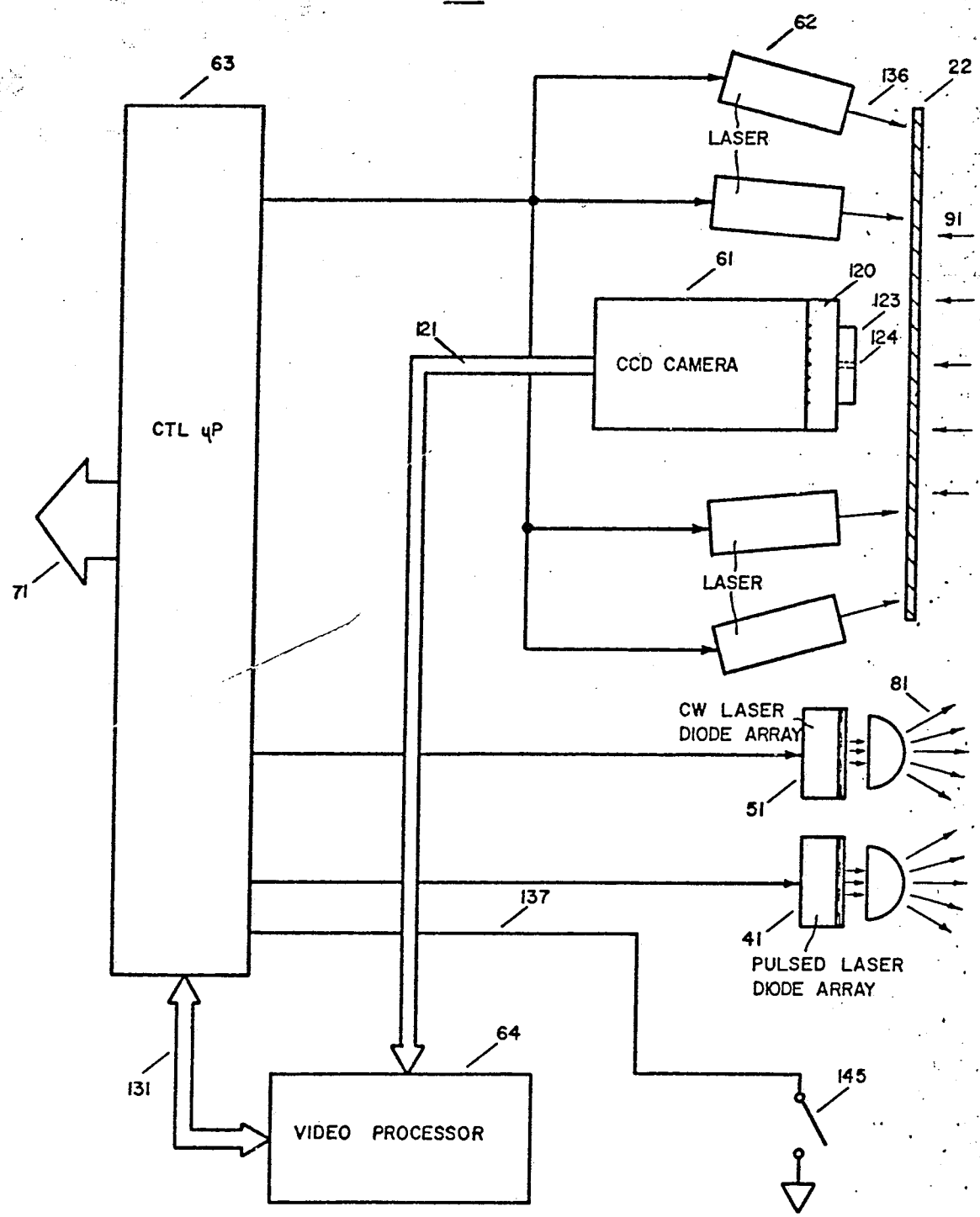
FIG. 7 is a block diagram of the CTL subsystem.

The CTL sensor subsystem 60, which operates over target ranges from 3 meters to 20 centimeters is described in greater detail with reference to FIG. 7, FIG. 8 and FIG. 9. CTL 60 comprises a CCD solid state TV camera 61, both the pulsed 41 and CW 51 laser arrays previously described, four narrow beam diode lasers 62, a video processor 64 and a microcomputer controller 63. The two laser arrays 41, 51 are enabled with all elements 46, 112 active simultaneously to illuminate the target vehicle 21. The narrow beam lasers 62, which designate bright spots 135 on the docking plate 17, are used in the last meter of closure to indicate target range and attitude.

A key element of the CTL sensor 60 is the CCD camera 61 which comprises a 491×491 array of active elements 120 which are highly sensitive to the 905 nanometer source radiation 91. The camera 61 is a high resolution sensor capable of imaging the docking plate 17 and generating a stream of digital data on data bus 121, one byte for each of the 241,081 pixels in the array 120, thirty times per second. The data is continuously fed to a video processor 64, which analyzes selected data to determine target angular direction, range and attitude. Target data is periodically read by the CTL microcomputer 63 and transferred to the CPU 70, so that guidance commands 5 can be generated to accurately maneuver the host probe 12 into the target port 18 for hard docking.

The CTL subsystem 60 operates in two range dependent modes. From a range of 3 meters to a range of one meter, the system 60 processes the shape of the docking plate 17 in the CCD image (see FIG. 9). When the CTL 60 is initially activated, the CTL microcomputer 63 enables both laser diode arrays 41, 51 with all elements active and each diode in the pulsed array 41 operating at 10,000 pulses per second. Therefore, the docking plate 17 is illuminated with 300 milliwatts of continuous laser light in a 20° by 20° beam. The resulting image 130 (see FIG. 8) is that of a white square surface 122 on a black background subtending a black crosshair pattern 126.

The retroreflective bead material covering the majority of the docking plate 17 area 122 returns the source radiation 91 toward the CCD camera 61 in roughly a 10° diverging beam. As a result, the irradiance at the camera input 123, at the maximum range of 3 meters, is about 20 db above the camera's 61 minimum discernable signal with an 11 millimeter, F1.4 lens 123 and a 20° field-of-view. The fact that the irradiance is excessive allows the F-stop 124 of the camera 61 to be closed down to 1/32, while maintaining good image 130 contrast. The result is that of a pinhole camera with a very long depth of focus. The combination of intense laser illumination 81, the retroreflective docking plate surface 122 and the small camera aperature 124 represents a key feature of the present invention, since no moving mechanisms are required to maintain image 130 exposure or focus over the operating distances from 3 meters to 20 centimeters. The camera optics 123 look through the same infrared filter window 22 previously described. The filter 22 passes only a narrow band of wavelengths about the source line (905 nanometers), thereby significantly attenuating broadband sources of interference (not shown), such as the sun.

SHAPE MODE

Figure 8:
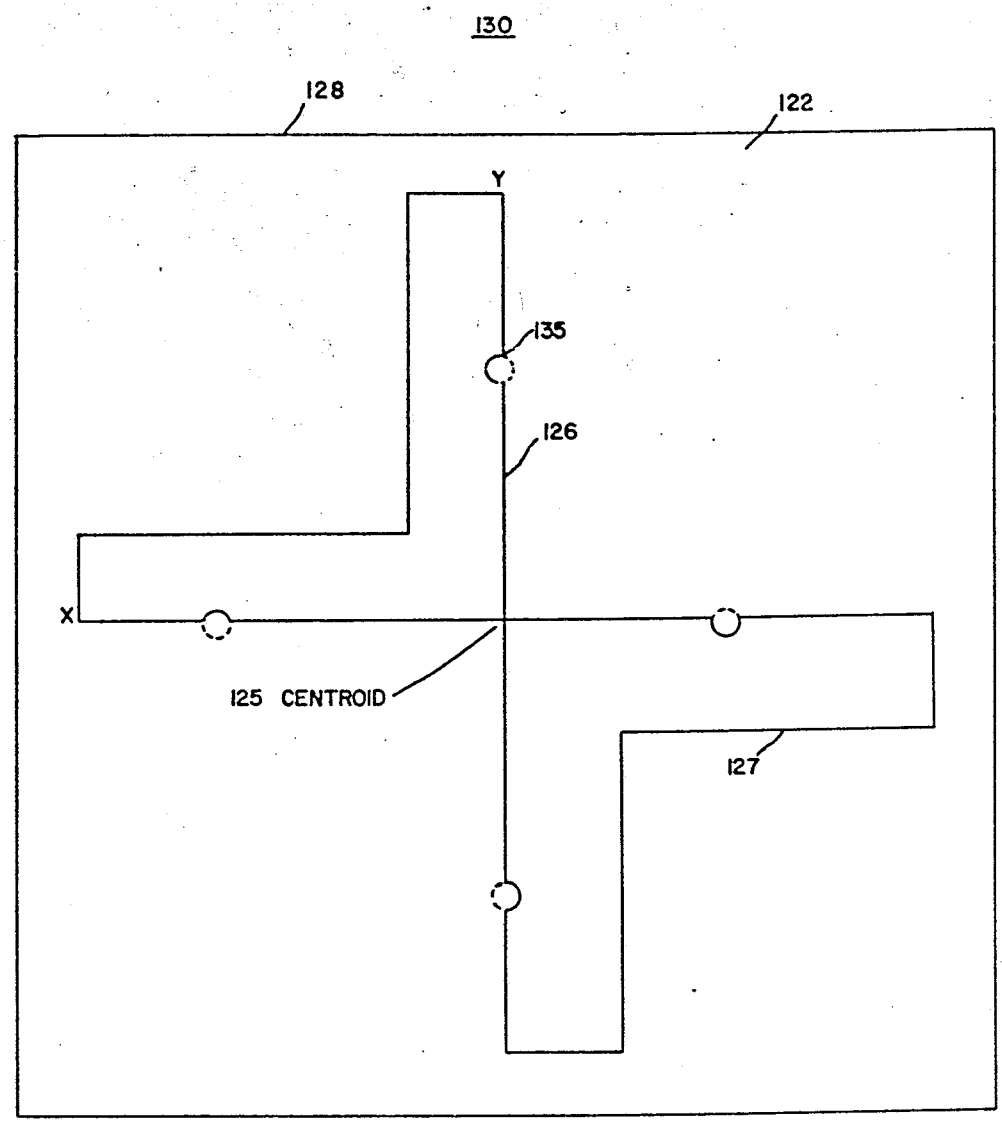
FIG. 8 is a perspective frontal view of the docking plate.

In the first operating mode, the video processor 64 employs optical contrast video tracking techniques, known in prior art, to acquire the docking plate image 130 and to locate the plate centroid 125 (the junction of the two, black crosshair pointers 126, seen in FIG. 8). The camera 61 images a 20° by 20° scene on the 491×491 array of detector elements 120. Therefore, each picture element (pixel) 120 covers a 0.7 milliradian field. A pixel coordinate system, where 0<X<491 and 0<Y<491, is used to indicate the relative angular direction in azimuth and elevation, respectively, of any discrete pixel in the scene. The video processor 64 locates the crosshair centroid 125 and outputs the image pixel coordinates (X,Y) to the CTL microcomputer 63. The CTL 60 then transfers the target coordinate data to the CPU 70, so that pitch and yaw commands can be generated to keep the CCD camera 61 pointed directy at the plate centroid 125. This process is periodically repeated, because other video processing schemes utilized in the CTL subsystem rely on the plate image 130 remaining in the center of the picture.

With the docking plate 17 centered in the image 130, the video processor 64 analyzes each horizontal line (not shown) in the scene, locates the thicker crosshair sector 127 and computes the relative target roll angle and roll rate. In a like manner, roll data is transferred to the CPU 70, so that it can output host 13 roll commands necessary to orient the image 130 as seen in FIG. 8 and to zero the roll rate.

With both the camera 61 pointing angle and the host 13 roll angle properly oriented, the CTL microcomputer 63 next analyzes the shape (see FIG. 9) of the docking plate image 130 to determine the attitude of the target vehicle 21. If the target attitude is perfectly matched with that of the chaser 13, then the perimeter 128 of the plate image 130 is perfectly square. If, on the other hand, the target is pitched up in the +Y direction, for example, then the image 130 is that of a trapezoid 129 with the parallel lines 141, 142 horizontal and the shorter side 141 on the top of the image 130. The relative length of the top 141 and bottom 142 lines, the ratio of the height to the average width and the angles of the sides off the vertical all are mathematically related to the magnitude of the pitch angle. In addition, each of these parameters can be measured by the video processor 64 by locating the black to white transitions in the image 130 and counting image pixels to define the perimeter lines 128. The video processor 64 generates pixel count data corresponding to each parameter, which are passed on to the CPU 70 via the CTL microcomputer 63 and data buses 131, 71. The CPU 70 performs the necessary computations to determine target attitude and to generate the guidance commands 5 required to move the host 13 directly onto the target Z axis, thereby aligning the probe 12 with the port 18.

Figure 9:
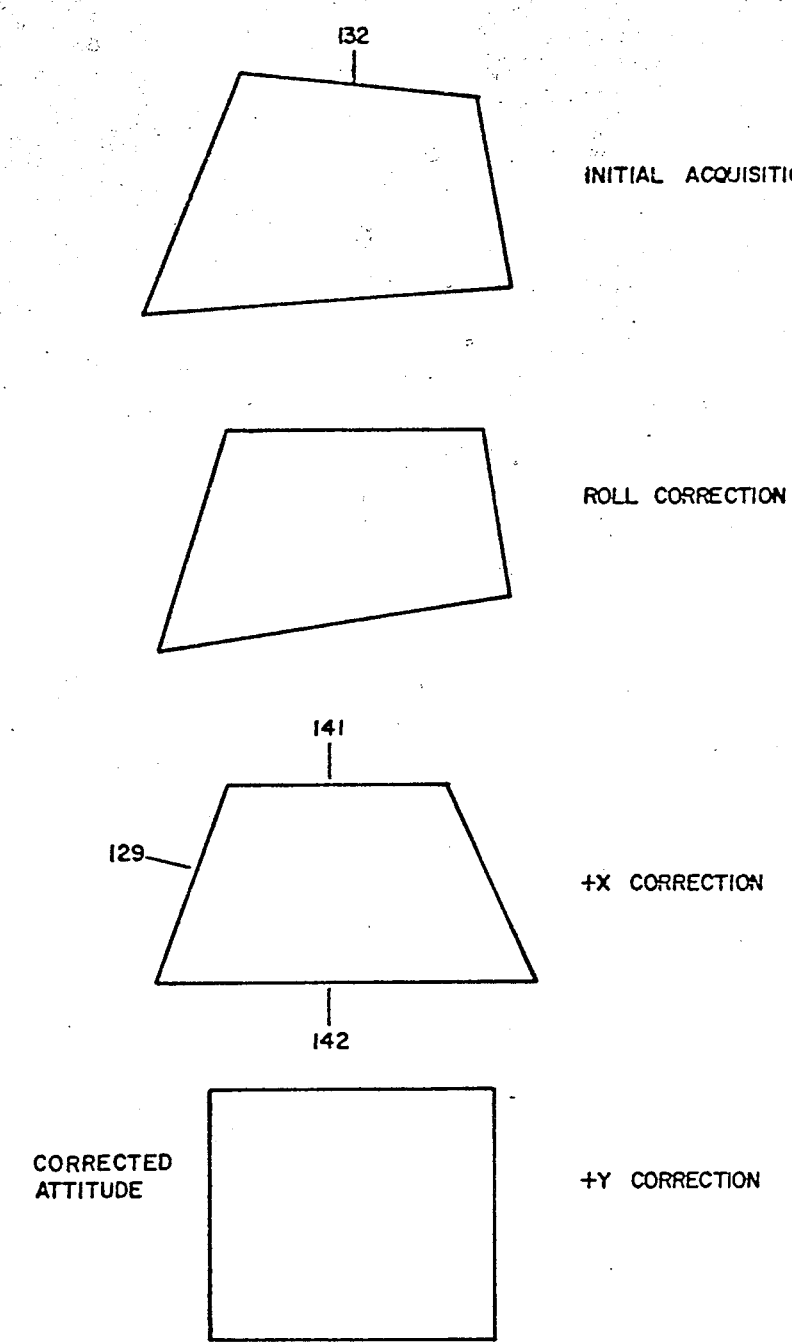
FIG. 9 is a perspective view of docking plate perimeter image shapes.

An alternate technique which is less math intensive is illustrated in FIG. 9. When the docking plate image 130 is initially acquired, it is likely that the target attitude is off both in pitch and yaw. The result is a complex four sided image 132, with opposite sides non-parallel but converging along the X and Y axes of the image. In this method, the video processor 64 simply determines the directions of convergence (either +X or −X and +Y or −Y) and passes this information through the CTL microcomputer 63 to the CPU 70. The CPU 70 then maneuvers the host 13 in the indicated ±X and ±Y directions until the CTL 60 indicates that the image shape 130 is square and the attitude is corrected.

With the relative attitude adjusted, target range is measured in the video processor 64 by counting the number of pixels across the plate image 130. The count, which is inversely related to target range, is periodically transferred to the CPU 70 which computes range and range rate.

Target vehicle 21 tracking resolution (the processor's 64 ability to locate the centroid pixel 125), is defined by the field coverage of each pixel, i.e. ±0.7 milliradians in azimuth and elevation. Roll measurement resolution is a function of the image 130 size. At a range of one meter, the roll angle can be measured with a resolution of ±0.1 degree. Attitude measurement resolution depends on the method selected, the magnitude of the attitude offset angles and the target range. Assuming the method which processes the relative lengths of opposite sides to determine attitude, the resolution is about ±0.5 degrees at a range of one meter. Range measurement resolution improves as the range closes. At a range of one meter, the measurement resolution is about ±2.0 millimeters.

Since the CTL 60 is controlled by a microcomputer 63, the microcomputer firmware is a key component of the system. The CTL microcomputer 63 firmware is described by means of the following "pseudo code" listing, where each line represents a machine language program which executes the indicated function:

```
SHAPE PROCESSING
        ACTIVATE ILLUMINATOR
        INITIALIZE VIDEO PROCESSOR
    30 GET CROSSHAIR COORDINATES (X,Y)
        OUTPUT (X,Y) TO CPU
    50 GET TOP LINE ROLL ANGLE (r)
        IF r = 0 then 90
        OUTPUT ROLL STEP TO CPU
```

```
        GOTO 50
    90 GET X CONVERGENCE SIGN +/−
        IF 0 THEN 130
        OUTPUT +/− X STEP TO CPU
        GOTO 90
    130 GET Y CONVERGENCE SIGN +/−
        IF 0 THEN 160
        OUTPUT +/− Y STEP TO CPU
        GO TO 130
    160 GET RANGE/SIZE PIXEL COUNT (R)
        OUTPUT R TO CPU
        IF RANGE = 1 METER THEN 200
        ELSE 30.
```

LASER SPOT PROCESSING

At ranges below one meter, the docking plate image 130 size exceeds the FOV of the CCD camera 61. A laser spot image 135 processing method, employed in the final stage of hard docking, is described with reference to FIG. 7 and FIG. 8. Four narrow beam, GaAs diode lasers 62 are arranged about the CCD camera 61; one on the +Y axis, one on the −Y axis, one on the +X axis and one on the −X axis. Each laser 62 is physically offset by 10 centimeters (from the camera Z axis) and pointed toward the camera axis at a convergence angle of 16 degrees. Therefore, at a range of 35 centimeters, all four laser beams 136 intersect the camera Z axis (not shown). This geometry results in four bright spots 135 imaged on the axes of the docking plate crosshairs 126 (see FIG. 8). The laser spot 135 intensity is roughly 30 times the intensity of the broadbeam laser 81 illuminated image plate 17, whether the spot designates the retroreflective material 122 or the non-retroreflective surface 126. The resulting video signal contrast allows the video processor 64 to locate the bright spots 135 in the image 130 by simple threshold detection. Due to the 16 degree convergence angles, as the target range closes, each spot 135 moves through the image along its associated axis toward the pattern centroid 125. At a range of 35 centimeters, all four spots 135 overlap at the centroid 125. As the range continues to close, the spots 135 cross through the centroid 125 and move to the opposite sides of the image 130. At the minimum range of 20 centimeters, the hard docking range, the spots 135 fall on the outer perimeter 128 of the CCD camera 61 FOV 90.

The general technique employed by the video processor 64 in this mode is to count the number of pixels from the centroid 125 (along each axis) to each laser spot 135. The four sets of pixel counts are mathematically related to the range from the camera 61 to each spot 135 designated on the docking plate 17. Knowing the range to four points on the target surface, provides a measure of target range and attitude.

Image plate centroid 125 tracking and roll angle adjustments are executed as previously described. The geometry of the crosshair pattern 126, provides a centroid image 125 (the junction of the two crosshair points in FIG. 8) with zero size. Therefore, the centroid 125 pixel location can be sensed by the video processor 64 even at zero range.

As the target range closes through the final meter, the video processor periodically outputs the pixel coordinates (X,Y) of the centroid 125, the relative roll angle (r), and the four sets of laser spot pixel counts to the CTL microcomputer 63 via data bus 131. The CTL microcomputer 63 passes the target data to the MAS- TER CPU 70, so that guidance commands 5 can be generated to maintain alignment of the docking probe 12 with the docking port 18. In addition, the final target range and range rate are computed by averaging the four spot ranges. At a range of 35 centimeters, when the laser spots converge, the probe 12 enters the port 18. At a range of 20 centimeters the probe end (not shown) makes contact with the target port 18, and a hard docking indicator switch 145 is closed. The switch 145 closure is sensed by the CTL microcomputer 63 via line 137. This information is passed to the CPU 70 which deactivates all systems and terminates the mission.

Measurement resolution in the spot 135 processing method is a function of the magnitude of spot movement in the image as the range and attitude change. Both attitude and range measurement resolution are nonlinear functions of target range and attitude. However, at a range of 50 centimeters attitude resolution is about ±1.2 degrees and range resolution is about ±3.0 millimeters. At a range of 25 centimeters, attitude resolution is ±0.2 degree and range resolution is about ±0.3 millimeter.

Laser spot 135 processing, CTL microcomputer 63 firmware, which is an integral component in the subsystem 60, is described in the following pseudo code listing, wherein each line represents a machine language program which executes the indicated function:

---

LASER SPOT PROCESSING
```
200 GET CENTROID COORDINATES (X,Y)
    OUTPUT (X,Y) TO CPU
220 GET ROLL ANGLE (r)
    IF r = 0 THEN 260
    OUTPUT ROLL STEP TO CPU
    GOTO 220
260 GET LASER SPOT COUNT (C)
    IF C < 4 THEN 200
    GET +X PIXEL COUNT (+PX)
    GET -X PIXEL COUNT (-PX)
    GET +Y PIXEL COUNT (+PY)
    GET -Y PIXEL COUNT (-PY)
    OUTPUT (+PX,-PX,+PY,-PY) TO CPU
    IF RANGE > 25 CENTIMETERS 200
330 TEST DOCK INDICATOR
    IF HARD DOCK THEN 360
    GOTO 330
360 OUTPUT DOCK INDICATOR TO CPU
    END.
```
---

MASTER CPU

The DROID Master CPU 70 is a more powerful sixteen bit microprocessor with sufficient mathematics capability to process the target data supplied by the PAL microcomputer 43, the CAL microcomputer 53 and the CTL microcomputer 63 to generate guidance commands 5 required to maneuver a space vehicle 13 through the last few hundred meters of a hard docking mission. Since the DROID system 10 is intended for use in various types of vehicles 13, the Master CPU 70 memory is that of a plug in programmable read only memory (PROM) (not shown). Different space vehicles 13 can be expected to have different guidance and response characteristics. Therefore, the Master CPU 70 PROM can be customized for each vehicle 13 to adapt the guidance commands 5 generated as necessary. Space vehicles 13 which must execute automated docking missions can be expected to have groups of control thrusters 15 manipulated by a GNC computer 14 effective to maneuver the craft in pitch, yaw, roll, X, Y and Z. In addition, thruster 15 burn can be controlled in a manner to effect the rate of the maneuver. Therefore, the Master CPU 70 analyzes the target data and generates the following types of commands:

(1) ±PITCH
(2) d(PITCH)/dt
(3) ±YAW
(4) d(YAW)/dt
(5) ±ROLL
(6) d(ROLL)/dt
(7) ±X
(8) dX/dt
(9) ±Y
(10) dY/dt
(11) ±Z
(12) dZ/dt.

The Master CPU 70 establishes two-way communication with the GNC computer 14 by means of data bus 19. In addition to the guidance commands 5 which must be transferred, the Master CPU 70 receives an enable command 6 from the GNC 14 which activates the DROID system 10 and outputs a hard dock command 9 which terminates the mission. As previously described, the CPU also outputs a "bailout" command 7 any time a sensor subsystem fails and the docking mission is in jeopardy. The "bailout" command 7 initiates a preprogrammed −Z maneuver designed to avoid a catastrophic collision with the target vehicle 21.

The DROID system 10 can be labeled an intelligent sensor since the Master CPU 70 acts to reconfigure the system on the basis of the sensed environment and changing mission requirements. In this process, the CPU 70 performs two important tasks. One is to monitor the operating condition of each sensor and target data to determine when it may be unsafe to proceed. The other is to process target data to generate guidance commands 5. The Master CPU 70 firmware, which is an integral component of the system 10, is described in the following "pseudo code" listing, where each line represents a machine language or higher level program to execute the indicated function. Associated guidance commands 5 are also given:

---

```
INITIALIZATION
  10 VERIFY ENABLE COMMAND
     INITIALIZE DATA BASE
     EXECUTE SELF DIAGNOSTICS
     EXECUTE PAL DIAGNOSTICS
     EXECUTE CAL DIAGNOSTICS
     EXECUTE CTL DIAGNOSTICS
     ON FAILURE GOTO 2000
     ELSE GOTO 80
TARGET ACQUISITION
  80 ACTIVATE PAL SEARCH
     EXECUTE SPIRAL MANEUVER         (P,Y)
     TEST TARGET DATA
     IF NO TARGET THEN 80
     ELSE GOTO 130
PAL TARGET TRACK
 130 ACTIVATE PAL TRACK
     TEST TARGET DATA
     NULL TARGET ANGLES              (P,Y)
     CLOSE TARGET                    (+Z)
     COMPUTE RANGE, RRATE
     SLOW CLOSURE TO 30 M/S          (−Z)
 190 TEST TARGET DATA
     NULL TARGET ANGLES              (P,Y)
     COMPUTE RANGE, RRATE
     IF RANGE > 200M THEN 190
     SLOW CLOSURE TO 10 M/S          (−Z)
 230 TEST TARGET DATA
     NULL TARGET ANGLES              (P,Y)
     COMPUTE RANGE, RRATE
     IF RANGE > 60M THEN 230
```

-continued

```
            SLOW CLOSURE TO 1 M/S                  (−Z)
            NULL TARGET ANGLES                     (P,Y)
            ACTIVATE CAL
            EXECUTE CAL DIAGNOSTICS
            ON FAILURE GOTO 2000
        320 TEST TARGET DATA
            COMPUTE RANGE, RRATE
            IF RANGE > 35 THEN 320
            ENTER PAL/CAL HANDOVER
CAL TARGET TRACK
            DEACTIVATE PAL
        370 TEST TARGET DATA
            COMPUTE CENTROID POSITION
            NULL TARGET ANGLES                     (P,Y)
            COMPUTE RANGE, RRATE
            IF RANGE > 20M THEN 370
        420 TEST TARGET DATA
            COMPUTE RANGE, RRATE
            COMPUTE CENTROID POSITION
            COMPUTE ATTITUDE
            COMPUTE ROLL
            NULL Z AXIS OFFSET                     (X,Y)
            NULL TARGET ANGLES                     (P,Y)
            NULL ROLL ANGLE                        (r)
            IF RANGE > 5M THEN 420
            SLOW CLOSURE TO 0.1M                   (−Z)
            TEST TARGET DATA
            COMPUTE RANGE, RRATE
            COMPUTE CENTROID POSITION
            COMPUTE ATTITUDE
            COMPUTE ROLL
            NULL TARGET ANGLES                     (P,Y)
            NULL Z AXIS OFFSET                     (X,Y)
            NULL ROLL ANGLE                        (r)
            ACTIVATE CTL
            EXECUTE CTL DIAGNOSTICS
            ON FAILURE GOTO 2000
        590 TEST TARGET DATA
            COMPUTE RANGE, RRATE
            IF RANGE > 3M THEN 590
            ENTER CAL/CTL HANDOVER
CTL SHAPE TRACK
            DEACTIVATE CAL
        640 GET CROSSHAIR COORDINATES
            NULL TARGET ANGLES                     (P,Y)
            GET SHAPE DATA
            COMPUTE ROLL ANGLE
            IF ROLL = 0 THEN 710
            NULL ROLL ANGLE                        (r)
            GOTO 640
        710 GET CROSSHAIR COORDINATES
            NULL TARGET ANGLES                     (P,Y)
            GET SHAPE DATA
            TEST X CONVERGENCE                     (+,−,0)
            IF CONV = 0 THEN 780
            NULL X CONVERGENCE                     (X)
            GOTO 710
        780 GET CROSSHAIR COORDINATES
            NULL TARGET ANGLES                     (P,Y)
            GET SHAPE DATA
            TEST Y CONVERGENCE                     (+,−,0)
            IF CONV = 0 THEN 850
            NULL Y CONVERGENCE                     (Y)
            GOTO 780
        850 GET SHAPE DATA
            COMPUTE RANGE, RRATE
            IF RANGE > 1M THEN 640
CTL SPOT TRACK
        880 GET TARGET DATA
            NULL TARGET ANGLES                     (P,Y)
            NULL ROLL ANGLE                        (r)
            GET SPOT DATA
            XCOUNT = (+XCOUNT)−(−XCOUNT)
            IF XCOUNT > 0 STEP RIGHT               (+X)
            IF XCOUNT < 0 STEP LEFT                (−X)
            YCOUNT = (+YCOUNT)−(−YCOUNT)
            IF YCOUNT > 0 STEP UP                  (+Y)
            IF YCOUNT < 0 STEP DOWN                (−Y)
            GET SPOT DATA
            IF XCOUNT = YCOUNT = 0 THEN 1010
       1000 GOTO 880
       1010 GET SPOT DATA
            COMPUTE RANGE, RRATE
            TEST SPOT CONVERGENCE
            IF RANGE > 35 CM THEN 1010
            ACTIVATE HARD DOCK MECHANISMS
       1060 TEST DOCK INDICATOR
            IF HARD DOCK THEN 3000
            GOTO 1060
BAILOUT
       2000 OUTPUT BAILOUT COMMAND
            EXECUTE MANEUVER                       (P,Y,−Z)
HARD DOCK
       3000 OUTPUT HARD DOCK COMMAND
            TERMINATE SYSTEMS.
```

TRANSCEIVER CONFIGURATIONS

With regard to the orthogonal transceiver configuration described for the PAL and CAL sensors, it should be noted that equivalent resolution can be obtained by various other configurations. Some of these (not shown) include two transmitter arrays of the type described oriented orthogonally to each other combined with a single element, wide field receiver; a two dimensional transmitter array combined with a single element, wide field receiver; a single element, broad beam transmitter combined with a two dimensional receiver array; and various other configurations. The orthogonal transceiver of the preferred embodiment carries the advantages of a low component count and high speed of operation.

Although the present invention is particularly significant for the development of space, and it has been described primarily in the context of space applications, it is obvious to those skilled in the art that the ability to sense the direction, range and attitude of a target renders it useful in various military applications as well as in the robotics and security industries. Operations such as the airborne refueling of aircraft are manual by nature, and nighttime operation can be significantly aided by the sensors of the present invention. Properly arranging the retroreflector pattern on the fuel receiving basket allows the entire operation to be automated. In the security field, more powerful laser sources render the system suitable for covert operation as an area surveillance radar, solving the problem of undesired, omnidirectional emission associated with conventional radar. A key industrial application of the present invention resides in the field of robotics. Robot vision currently requires dual television cameras, moving pedestals and a great deal of video processing electronics to emulate depth perception. The ability of the present invention to indicate target direction, range and attitude without the need for moving parts, provides a reliable approach to depth perception for robots. Activating the sensors of the present invention in alternating, sequential fashion allows a robot to locate a target at long range, to maneuver to the target while avoiding close range obstacles and to sense the relative attitude of the target at very close ranges. Such capabilities allow a robot to perform many kinds of proximity manipulations.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. An Optoelectronic system for docking a host object to a target object having a docking port comprising:
    (a) first optical means secured on said host object and effective for both establishing a source of light radiation waveforms and receiving reflected light radiation;
    (b) data processing means comprising a master central processing unit associated with said first optical means effective to analyze target information to produce guidance commands for maneuvering said host object to dock with said target object;
    (c) second optical means secured on said target object and effective for returning incident light radiation in the direction of said source of light radiation, said second optical means comprising a pattern of three retroreflectors separated and arranged in an isosceles triangle about said docking port and a retroreflective image plate juxtaposed to said docking port, said image plate being defined by a flat surface having a centroid thereon and having a preselected perimetric shape subtending a contrasting crosshair pattern of nonretroreflective material effective to identify said centroid;
    said first optical means comprising first, second and third optoelectronic sensors including first, second and third microcomputers, respectively, and first, second and third range processing circuits, respectively, connected therewith, said first and said second optoelectronic sensors being configured for illuminating at preselected target distances said retroreflectors and said image plate and detecting and processing light illumination waveforms returned from said retroreflectors, and said third optoelectronic sensor being configured for further illuminating within preselected target distances said image plate and detecting and processing light illumination waveforms returned therefrom, each of said optoelectronic sensors, associated microcomputers and range processing circuits being configured for determining within preselected target distances and independently of the other said optoelectronic sensors the position and range of said target object from said host object and transmitting information on said position and range to said master central processing unit;
    said first optoelectronic sensor comprising a pulsed array laser radar subsystem;
    said second optoelectronic sensor comprising a continuous array laser radar subsystem; and
    said third optoelectronic sensor comprising a charge coupled device television laser radar subsystem.

2. A system according to claim 1, wherein said first optoelectronic sensor is adapted to operably scan the target over ranges from approximately one thousand meters to approximately thirty meters and is effective to illuminate said second optical means in order to detect the returned light and sense the angular direction and range of the target spacecraft and to transfer the information to said data processing means.

3. A system according to claim 2, wherein said first sensor is composed of a first and a second set of elements arranged in an array, each element of the first set comprising a pulsed laser transmitter and each element of the second set comprising a light radiation receiver being sensitive solely to a predetermined narrow band of light radiation.

4. A system according to claim 3, wherein said first set of elements are effective to propagate independent beams of laser light through a system of lenses to effect a cooperative beam pattern, wherein substantially one degree horizontal by twenty degrees vertical beam cross-sections of each element are effective to illuminate mutually exclusive but juxtaposed fields in space, and wherein the combination of all said beam cross-sections is arranged to cover the entire optically effective field of view of the first optical means.

5. A system according to claim 3, wherein said second set of elements are arranged to view space through a system of lenses to effect a cooperative pattern of viewing fields, wherein substantially twenty degree horizontal by one degree vertical field cross-sections of each element are effective to view mutually exclusive but juxtaposed fields in space, and wherein the combination of all fields is arranged to cover the entire optically effective field of the first optical means.

6. A system according to claim 3, wherein said first sensor further includes a single element light radiation receiver effective to view the entire optically effective field of view of the first optical means and to initially detect light radiation waveforms returned from said target object to thereby effect through said first microcomputer activation of said second set of elements; a first range processing circuit effective to measure the round trip propagation time of the light emanating from said first optical means and returned from said second optical means; and a first microcomputer effective to activate said transmitter elements, to monitor said receiver elements and to process data from the sensor elements to determine target direction and range.

7. A system according to claim 6, wherein each said transmitter comprises a combination of a laser pulse forming network and a pulsed laser diode, and wherein each transmitter is responsive to be selectively triggered by said first microcomputer to establish laser beam emanation for the duration of said pulse.

8. A system according to claim 6 wherein each said receiver is composed of a combination of light detector, signal amplifier and digital latching circuit with the binary state of each said latch effective to represent the presence or absence of a target return, and wherein the state of each said latch is selectively readable and clearable by the first microcomputer.

9. A system according to claim 6, wherein said single element receiver comprises a light detector and lense system arranged to sense the entire optically effective field of the first optical means, a signal amplifier and a digital latching circuit with the binary state of said latch effective to represent the presence or absence of a target return, and wherein the latch output state is coupled both to the first microcomputer and the first range processing circuit.

10. A system according to claim 6, wherein said first range processing circuit comprises a high frequency clock and a digital counter circuit effective to count clock cycles occurring between laser pulse transmission and laser pulse reception and to transfer said count data to said first microcomputer.

11. A system according to claim 10, wherein said first microcomputer is effective to selectively and sequentially trigger each transmitter element, execute a delay, selectively read and clear the binary state of each said receiver element and store said count data and data identifying the transmitter and receiver elements associated with each target return.

12. A system according to claim 1, wherein said second optoelectronic sensor is adapted to operably scan the target over ranges of approximately fifty meters to approximately three meters, to illuminate said retroreflectors of said second optical means, to detect the returned light radiation, to sense the direction and range of each of said retroreflectors and to transfer target information to said data processing means.

13. A system according to claim 12, wherein said second sensor is composed of a first and second set of elements arranged in an array, each element of the first set comprising a continuous laser transmitter having the amplitude of its output light modulated in the waveform of a sine function; and each element of the second set comprising a light radiation receiver being sensitive solely to a narrow band of radiation of the wavelength of the transmitted light.

14. A system according to claim 13 wherein said first set of elements are effective to propogate independent beams of laser light through a system of lenses to effect a cooperative beam pattern, wherein substantially one degree horizontal by twenty degrees vertical beam cross-sections of each element are effective to illuminate mutually exclusive but juxtaposed fields in space, and wherein the combination of all said beam cross-sections is arranged to cover the entire optically effective field of view of the first optical means.

15. A system according to claim 13, wherein said second set of elements are arranged to view space through a system of lenses to effect a cooperative pattern of viewing fields, wherein substantially twenty degree horizontal by one degree vertical field cross-sections of each element are effective to view mutually exclusive but juxtaposed fields in space, and wherein the combination of all fields is arranged to cover the entire optically effective field of view of the first optical means.

16. A system according to claim 13, wherein said second range processing circuit comprises a heterodyne phase comparator effective to measure the propagation phase delay between the transmitted modulation wave and the received modulation wave and to transfer the phase delay data to said second microcomputer.

17. A system according to claim 1, wherein said third optoelectronic sensor is adapted to operably scan the target over ranges of approximately five meters to essentially zero, to illuminate said retroreflective image plate of the second optical means, to image the returned light radiation, to sense the direction, attitude and range of said retroreflective image plate and to transfer target information to said data processing means.

18. A system according to claim 17, wherein said third sensor comprises a continuously emitting diode laser array effective to illuminate said image plate; an arrangement of multiple narrow beam diode lasers having the same wavelength of said illumination lasers effective to designate predetermined spots on the image plate of the target spacecraft; a solid state imaging device having a field of view essentially equivalent to the optically effective field of view of said first optical means and a central optical axis and being sensitive solely to a narrow band of radiation of the wavelength of said illuminating lasers effective to generate two dimensional, time sequential image frames of said image plate scene; video processing means effective to generate pre-selected data for identifying the position, size and shape of said image plate perimeter and crosshair pattern; and a third microcomputer effective to process said data from said video processor to determine target spacecraft direction, range and attitude.

19. A system according to claim 18, wherein all elements of said diode laser array are effective to emit continously through an optical lens system to generate an illumination field equivalent to the optically effective field of view of the first optical means.

20. A system according to claim 19, wherein said narrow beam lasers are composed of three or more continuously emitting lasers arranged offset from and symmetrically about said imaging device with each said beam being directed through the field of view of the imaging device toward a common point on said central axis effective to designate spots on the image plate, wherein the position of each said spot in said image has a known relation to the range from said imaging device to the spot designated on the target.

21. A system according to claim 18, wherein said solid state imaging device comprises a charge coupled television camera having a two dimensional array of light sensitive pixel elements and a pinhole optical system effective to create time sequential frames of focussed and properly exposed images of said image plate and to output a digital representation of each image pixel of each said frame to said video processing means.

22. A system according to claim 18, wherein said video processing means comprises a pre-programmed digital system effective to identify the perimetric image of said image plate and said crosshair pattern, to output data relating the shape and orientation of said images, to output the relative image location of the image plate centroid and to output the relative image location of each of said bright spots with all of said outputs transferred to said third microcomputer.

23. A system according to claim 1, wherein said data processing means is effective to test the operational state of each of said sensors, to activate said first sensor to acquire said target spacecraft and to sequentially activate said second and third sensors, depending on target range, to track said target during the docking operation.

* * * * *